Oct. 10, 1939.  M. L. ECKMAN  2,175,749
CABLE CONSTRUCTION
Filed Feb. 23, 1937
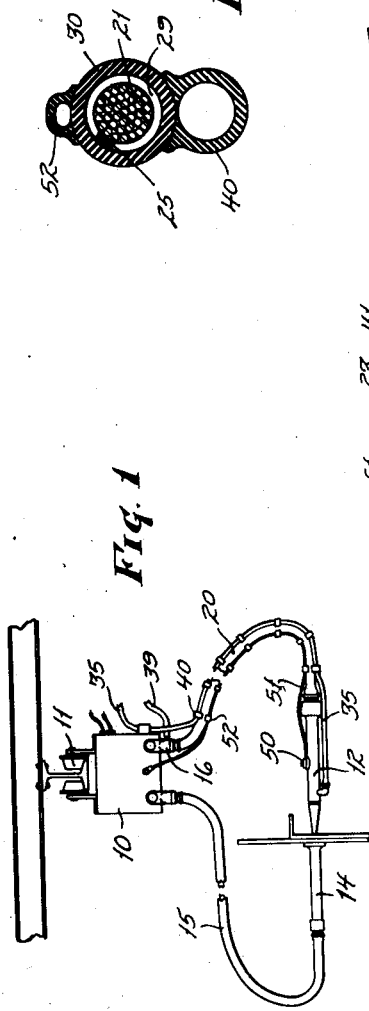
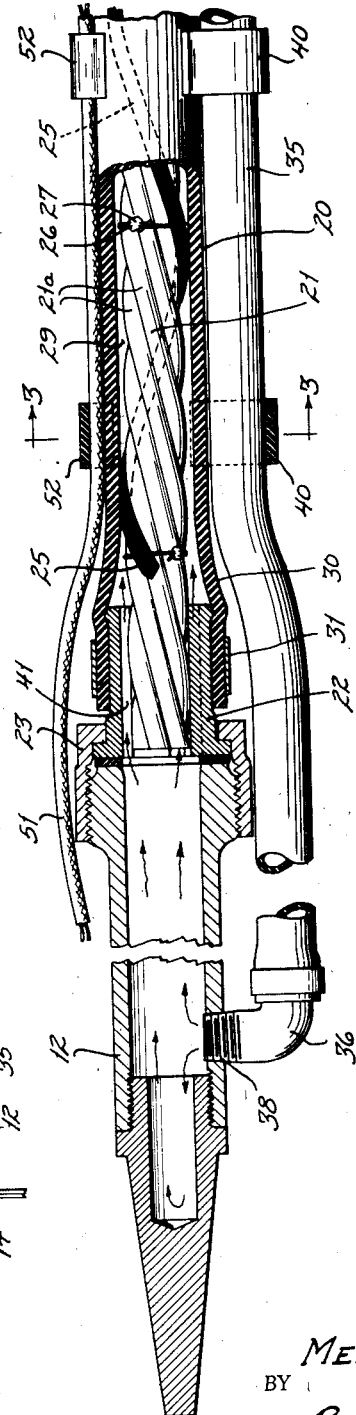
INVENTOR.
MERIL L. ECKMAN
BY
Bates, Goldrick, & Teare
ATTORNEYS Patented Oct. 10, 1939

2,175,749

UNITED STATES PATENT OFFICE 2,175,749

CABLE CONSTRUCTION

Meril L. Eckman, Cleveland, Ohio, assignor to American Coach and Body Company, Cleveland, Ohio, a corporation of Ohio Application February 23, 1937, Serial No. 126,995

5 Claims. (Cl. 174—15)

This invention relates to a cable construction, and especially to one that is intended for use in connection with an electric welding apparatus. More particularly, the present invention is concerned with a cable construction which may be interconnected between a power supply and a portable electric welding tool and which will include a conductor for supplying a welding current to the welding electrode, other conductors for controlling the power supply for the electrode, or operating mechanism therefor, together with conduits through which a cooling fluid may be circulated to cool both the electrode and the power-supply conductor. These, therefore, are the general objects of the present invention.

A more specific object of this invention is to provide a rugged cable construction which will be compact, flexible, simple to assemble and capable of being economically manufactured.

Another object of the present invention is to provide a cable construction for an electric welding mechanism or the like, which cable will include an electric conductor or cable enclosed within a flexible insulating sleeve, and so arrange the construction as to prevent contact between the insulation and the conductor to avoid burning of the insulation when the conductor becomes heated, due to prolonged periods of use.

A further object of the invention is to provide a cable construction arranged and adapted to supply a welding electrode with a welding current, and through which a circulatory flow of a cooling medium may be maintained for efficiently cooling both the electrode and the conductor.

Other objects of the present invention will become more apparent from the following description, reference being had to a preferred embodiment of the invention illustrated in the accompanying drawing. The essential features of the invention will be summarized in the claims.

In the drawing, Fig. 1 illustrates a welding unit or tool, comprising a pair of portable welding electrodes, one of which is connected to the power unit by my improved cable construction, the power unit and welding electrodes being more or less diagrammatically shown; Fig. 2 is a fragmentary section, illustrating my improved cable construction and the manner in which it may be secured to an electrode; Fig. 3 is a transverse section, taken through my improved cable, as indicated by the line 3—3 on Fig. 2.

Referring to the drawing, and especially to Fig. 1, I have diagrammatically illustrated a power supply unit 10, including the usual transformer or other suitable power supply, as being mounted on a support 11. Connected to this power supply unit 10 by my improved cable construction 20, is a suitable welding electrode 12, arranged to coact with another electrode 14, which is also connected to the power supply by a cable 15, which, if desired, may be constructed in all respects similar to the cable 20. My improved cable is preferably the usual copper wire conductor, and is capable of transmitting the desired welding current from the power unit 10 to the electrode 12. Such cables generally comprise a plurality of spirally wound strands 21a and may be secured at either end by sleeves, such as is shown in Fig. 2 at 22. The sleeves are generally arranged to be removably connected, by a coupling member 23, either with an electrode such as that indicated at 12, in Fig. 2, or a connector 16, for connecting the cable to the source of current supply.

Welding electrodes are subject to excessive heat during the welding operation. Hence, to protect the electrode they have been cooled by circulating a stream of cooling fluid therethrough. The conductor which conducts the welding current is also subjected to this excessive heat. Hence, I propose to expose the conductor, as well as the electrode, to the circulating cooling fluid. I accomplish this by providing a passageway for such fluid between the metallic conductor 21 and its sheath of insulation or rubber 30. As shown in the drawing, and especially in Fig. 2, I spirally wind an elongated rubber bead or ribbon 25 about the conductor 21. This ribbon is comparatively narrow and is secured to the conductor 21 at spaced intervals, by comparatively small wires 26. These wires are wrapped about the ribbon and conductor, as shown in Fig. 2, and are secured to the conductor by welding or soldering, as indicated at 27. The conductor 21, together with the ribbon 25, is enclosed within a flexible tube or conduit 30. This tube is preferably made of rubber or some other water-impervious material, and has its ends secured to the conductor sleeves 22, as by clamping rings 31. It will thus be seen that the bead or ribbon 25 separates the inner wall of the tube 30 from the outer wall of the conductor and forms a spiral passageway therebetween, and prevents burning of the insulation, due to contact with the cable, which becomes hot after periods of prolonged use.

As heretofore mentioned, welding electrodes of the type shown in the drawing, are generally cooled by circulating a stream of water through the hollow electrodes. Generally this is accomplished by a pair of conduits which are secured to the electrodes. In the present invention I have utilized, for one of these conduits, the cable construction carrying the welding supply conductor, and by so doing I cool and protect the conductor, and the connecting fitting between the conductor and the electrode. Thus, I prevent excessive deterioration of the cable insulation and the conductor.

As shown in the drawing, the cooling fluid is supplied to the electrode through a conduit 35, one end of which is connected with a source of cooling fluid, such as, for instance, a pump. The other end of this conduit 35 is secured to a fitting 36. This fitting, as shown in Fig. 2, is connected as at 38 to the hollow electrode 12. Thus, the cooling fluid enters the electrode, passes through suitable openings 41 formed in the conductor-attaching sleeve 22, and enters the spiral passageway 29 formed between the external walls of the conductor 21 and its insulating covering 30. The cooling fluid then passes through a connecting sleeve, similar to the sleeve 22, at the other end of the conductor 21 into the connector 16, and thence through a suitable conduit 39 and out of the cooling system.

It will be noted that by utilizing the passageway 29 between the conductor 21 and its protecting covering 30 as a passageway for the cooling fluid, I eliminate, in effect, one of the conduits usually used for the cooling fluid, thus reducing the number of conduits leading to the electrode and making the electrode easier to handle.

I further facilitate the handling of the electrode by cementing or vulcanizing to the conductor protecting tube 30, at spaced intervals, suitable rubber hose clamps 40, and I extend the cooling conduit 35 through such clamps, thus securing such conduit to the conductor, causing it to form a part of my improved cable construction.

Welding electrodes, such as that illustrated, are generally controlled by a switch which, for convenience, is located on the electrode, as indicated at 50 in Fig. 1. From this switch suitable flexible conductors 51, small in comparison with the conductors for the welding current, extend to the transformer or other power supply to enable the operator to selectively energize the electrode. To facilitate the handling of the electrode I secure these conductors to the protecting tube or conduit 30. For this purpose, I secure a second set of rubber clips 52 to the tube 30 either by cement or vulcanization and extend the control conductors or wires through such clips, as shown in Fig. 2.

From the foregoing description it will be seen that I have provided a simple and compact cable construction, for use with portable electric welding electrodes, which facilitates the cooling of both the electrode and the welding current conductor, and which at the same time provides a support for various control conduits; the arrangement being such that the conduits are supported at spaced intervals on the cables to facilitate the handling of the tool. I also utilize the protective cover or insulation of the current conductor to form one conduit for the circulation of the cooling fluid. I also increase the flexibility of the cable construction by spacing the insulating coating from the welding conductor. This also protects the insulation, inasmuch as when the conductor is in use in connection with a welding tool the connector becomes hot and contact between the hot conductor and the insulation would burn or otherwise damage the insulation. By maintaining the passageway between the conductor and the insulation filled with the cooling medium, the insulation is further protected against the heat of the conductor.

I claim:

1. A welding cable construction comprising in combination, an elongated hollow rubber tube, a flexible electrical conductor composed of strands of current conducting material, and extending axially within said tube, means comprising a flanged sleeve at one end of said tube to secure the conductor to said tube, means comprising a relatively narrow bead spirally wound about said conductor, and lying in a spiral groove in the periphery of the latter to space the conductor from the tube and form a spirally extending passageway for cooling fluid therebetween, the sleeve being provided with a passageway to permit circulation of said cooling fluid between the conductor and the tube.

2. A welding cable construction comprising an elongated hollow rubber tube, an electrical conductor extending axially within said tube, a connector having a passageway therethrough, said connector being interposed between the conductor and said tube at one end thereof, means to secure the connector to said tube, and means comprising a relatively narrow rubber bead spirally wound about said conductor to space the conductor from the tube and to form a spirally extending passageway for cooling fluid therebetween, the passageway in said connector communicating with the spiral passageway to thereby admit the circulation of a stream of said cooling fluid between the conductor and the tube.

3. A welding cable construction comprising in combination a flexible elongated insulating tube, an elongated flexible electrical conductor composed of spirally wound strands of current-conducting material extending axially within said tube, and an elongated insulating spacer wound upon said conductor in contact with adjacent strands and extending parallel therewith, to maintain a spiral passageway for cooling fluid between the conductor and the tube.

4. A welding cable, comprising an elongated core of relatively flexible metal strands, an elongated hollow flexible sheath of dielectric material surrounding the core and impervious to the passage therethrough of cooling liquid under considerable pressure throughout its length, flexible centering means extending along the core and operating to maintain a continuous passage between the core and sheath, and an electrical connector member at least at one end of the core about which member the sheath is sealed, said member having a passageway communicating with said continuous passage.

5. A welding cable comprising a flexible electric conductor, and a flexible tube of non-conductive material which is impervious to the passage of liquid through its walls at considerable pressure throughout the length of the tube, said tube loosely surrounding the core, an electrically non-conductive strip extending spirally about the core, to maintain a continuous passage lengthwise of the cable between the core and tube for cooling fluid, and an electrically conductive terminal member having a passage for said cooling fluid, in communication with said continuous passage, said terminal member being interposed between the flexible conductor and tube.

MERIL L. ECKMAN.